2,942,582
HYDRAULIC CYLINDERS

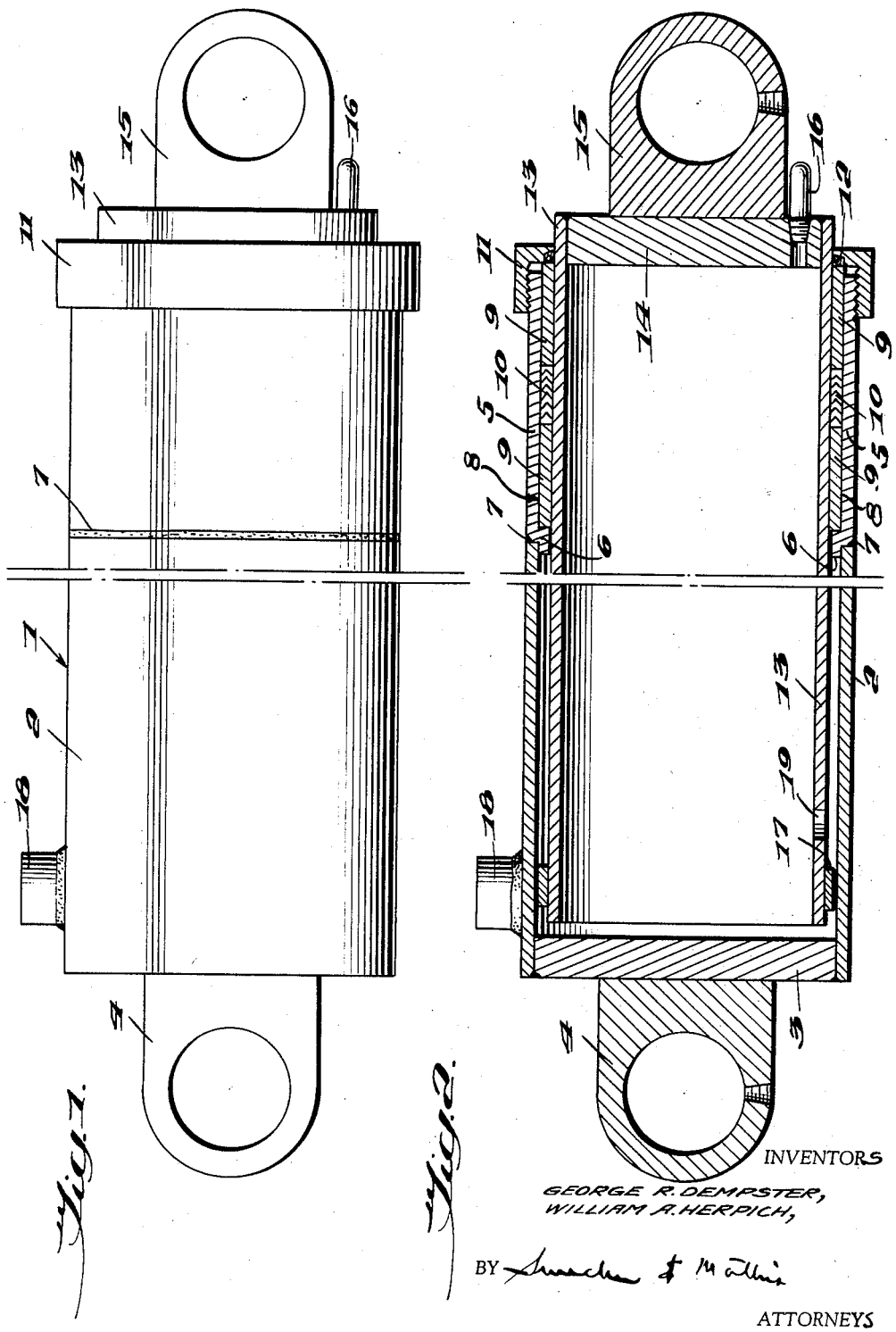

George R. Dempster and William A. Herpich, Knoxville, Tenn.; said Herpich assignor to Dempster Brothers, Inc., Knoxville, Tenn., a corporation of Tennessee Filed Sept. 5, 1957, Ser. No. 682,254

3 Claims. (Cl. 121—46)

The present invention relates to hydraulic cylinders, and more particularly, to expansible chamber type motors for use with hoists.

It has been customary in the past to construct hydraulic cylinders of steel tubing which must be machined and surface finished to insure a good bearing surface between the movable plunger and the stationary cylinder. Furthermore, it has been found necessary to provide a sealing ring at the open end of the stationary cylinder and a guide ring at the inner end of the plunger to prevent misalignment of the plunger in the cylinder.

Having in mind prior art cylinders, it is an object of the present invention to provide a cylinder which is of simple and inexpensive construction.

Another object is to provide a cylinder whose structure permits the use of standard sized steel tubing and requires only a minimum of machining and finishing.

The foregoing objects, and others ancillary thereto, we prefer to accomplish as follows:

According to a preferred embodiment of this invention, the main cylinder body and the plunger are constructed of standard size, seamless steel tubing. Packing rings, assembled in the stuffing box near the open end of the main cylinder, consist of two cylindrical rings separated by a set of V-shaped shaft packing rings. The packing rings extend along a substantial portion of the length of the cylinder to align the plunger in the cylinder. This makes it unnecessary to provide a guide ring on the inner end of the plunger, thereby saving the expense of honing the inside surface of the main cylinder. The stuffing box is made of heavy walled steel tubing and is machined out to receive the packing rings after being welded to the main cylinder.

This preferred embodiment of the invention is set forth in the accompanying drawings, in which:

Fig. 1 is a side elevational view of the cylinder; and
Fig. 2 is a cross-sectional view of the cylinder.

A hydraulic cylinder to be inexpensive, and yet sturdy, must be designed to utilize materials which are of standard size and shape, and parts which require little or no machining. Accordingly, a preferred embodiment of the invention, referring to Figs. 1 and 2 of the drawings, is constituted by a main cylinder body and a plunger in the cylinder mounted to move axially out of the cylinder when fluid pressure is applied to the interior of the cylinder.

The main cylinder body 1 comprises an outside steel tube 2, one end of which is closed by a cylinder head 3, welded to the tube. A bearing 4 on the cylinder head supports the main cylinder body during operation of the cylinder.

A stuffing box 5 is provided with an annular flange 6 which engages the open end of the steel tube 2. An annular weld 7 secures the tube and stuffing box together. The heavy walled tube 5 is welded to the light walled tube 2 before the cylindrical recess 8 is machined. This assures that the cylindrical recess 8 will be aligned accurately with the tube 2. The heavy walled tube of the stuffing box provides a stop for the plunger against the flange 6, without any additional machining.

Bearing rings 9, preferably of brass, are spaced longitudinally in the recess 8 to present a long bearing surface for the plunger. Thus, the rings 9 not only center the plunger in the main cylinder body, but also maintain its axial alignment. A set of V-shaped, rubber packing rings 10 separate the brass bearing rings 9 and prevent oil from leaking out of the cylinder. The rings 9 and 10 are held in the stuffing box by a packing nut 11, threaded to the stuffing box, cooperating with the walls of the recess 8 and the plunger tube 13. The packing nut contains a wiper ring 12, which seals the oil in the cylinder during movement of the plunger.

The plunger comprises an internal steel tube 13, one end of which is closed by a plunger head 14, welded to the tube. A bearing 15, welded to the head 14, supports the plunger during operation of the cylinder. A bleeder valve 16 is provided in the plunger head.

To limit outward movement of the plunger, a metal stop ring 17 is welded to the inner end of the plunger tube 13. By providing a close fit between the bearing rings 9 and the plunger tube 13, it is not possible for the stop ring 17 to make contact with the inside surface of the tube 2. It is, therefore, unnecessary either to hone the inside surface of the tube 2 or to use a bronze coating on the face of the stop ring.

Hydraulic fluid is admitted to the cylinder through an oil port 18 in the cylinder wall from any suitable source of supply according to the hydraulic system with which the cylinder may be connected. An opening 19 is provided in the plunger wall to permit hydraulic fluid to flow readily between the plunger and the cylinder.

In operation, hydraulic fluid under pressure is supplied through the oil port 18 to the interior of the main cylinder body. The pressure acting on the cross section of the plunger tube 13 and on the plunger head 14 causes the plunger to move in an outward direction. The plunger will continue to move outwardly as long as sufficient oil is supplied to overcome the force acting against the bearing 15. Outward movement of the plunger is limited by the stop ring 17, which contacts the flange 6 of the stuffing box. The cylinder is collapsed by reducing the fluid pressure sufficiently to allow the weight on the bearing 15 to force the fluid out through the oil port 18. Inward movement of the plunger is limited by the tube 13 contacting the cylinder head 3.

The advantages of the present invention are that it can be fabricated from standard steel tubing which requires a minimum of machining and that since there are no guide shoes on the lower end of the plunger, it is not necessary to hone the inside surface of the outside tube. For these reasons, the cylinder is inexpensive to construct and constitutes a material improvement.

By using the construction set forth, it is possible, for example, to use standard ¼" wall tubing for the cylinder 2, and standard ½" wall tubing for the stuffing box 6. These parts are welded together, providing a strong stopping means for the ram. By welding the heavy walled tube to the light walled tube, and machining after the welding, it helps to keep the machining of the heavy walled tube in line with the ¼" wall tubing.

While the invention has been illustrated and described in one embodiment, it is recognized that variations and changes may be made therein without departing from the invention as set forth in the claims.

We claim:

1. A hydraulic cylinder comprising a cylindrical body made of unmachined seamless metal tubing of a standard size, said tubing having a closure secured thereto at one end and open at the other end, an elongated stuffing box cylindrical metal tubing section of approximately the same outside diameter as that of the cylindrical body and concentrically arranged with said cylindrical body and having one end secured to the open end of said body, said stuffing box section having an inturned annular flange at its inner end, means secured to the other end of said stuffing box tubing section and confining packing therein, said packing confining means having an annular portion extending inwardly of said stuffing box tubing section, elongated spaced bearing rings within said stuffing box section and engaged between said annular flange and annular portion of said packing confining means with a compressible packing between the confronting ends of said bearing rings, the inner diameters of said bearing rings being less than the inner diameters of said annular flange and annular portion of the packing confining means, a cylindrical plunger tubing within said cylindrical body and supported by said bearing rings within said stuffing box section, the outer diameter of said plunger being les than the inner diameters of said annular flange and annular stuffing box section, said plunger having a ring fixed thereabout near its inner end, the outer diameter of said ring being less than the inside diameter of said cylindrical body, said inturned annular flange serving as a stop for the bearing rings and packing therebetween and serving also as a stop for the plunger ring to limit the outward movement of the plunger.

2. A hydraulic cylinder comprising a cylindrical body made of unmachined seamless metal tubing of a standard size, said tubing having a closure secured thereto at one end and open at the other end, an elongated stuffing box cylindrical metal tubing section of approximately the same outside diameter as that of the cylindrical body and concentrically arranged with said cylindrical body and having one end welded to the open end of said body, said stuffing box section having an inturned annular flange at its inner end, means secured to the other end of said stuffing box tubing section and confining packing therein, said packing confining means having an annular portion extending inwardly of said stuffing box tubing section, elongated spaced bearing rings within said stuffing box section and engaged between said annular flange and annular portion of said packing confining means with a compressible packing between the confronting ends of said bearing rings, the inner diameters of said bearing rings being less than the inner diameters of said flange and annular portion of the packing confining means, a cylindrical plunger tubing within said cylindrical body and supported by said bearing rings within said stuffing box section, said plunger having a ring fixed about its inner end, the outer diameter of said ring being less than the inside diameter of said cylindrical body, said inturned annular flange serving as a stop for the bearing rings and packing therebetween and serving also as a stop for the plunger ring to limit the outward movement of the plunger.

3. A hydraulic cylinder comprising a cylindrical body made of unmachined seamless metal tubing of a standard size, said tubing having a closure secured thereto at one end and open at the other end, an elongated stuffing box cylindrical metal tubing section of generally the same outside diameter as, but of greater wall thickness than, that of the cylindrical body and concentrically arranged with said cylindrical body and having one end welded to the open end of said body, the inner surface of said stuffing box section being recessed throughout substantially its length to provide an inturned annular flange at its inner end having a cutout in its outer surface receiving said open end of said body, means secured to the outer end of said stuffing box section and confining packing therein, said packing confining means having an annular portion extending inwardly of said stuffing box section, elongated spaced bearing rings within said stuffing box section and engaged between said annular flange and annular portion of said packing confining means with a compressible packing between the confronting ends of said bearing rings, the inner diameters of said bearing rings being less than the inner diameters of said annular flange and annular portion of the packing confining means, a cylindrical plunger tubing within said cylindrical body and supported by said bearing rings within said stuffing box section, the outer diameter of said plunger being less than the inner diameters of said annular flange and annular stuffing box portion, said plunger having a ring fixed thereabout near its inner end, the outer diameter of said ring being less than the inside diameter of said cylindrical body, said inturned annular flange serving as a stop for the bearing rings and packing therebetween and serving also as a stop for the plunger ring to limit the outward movement of the plunger.

References Cited in the file of this patent

UNITED STATES PATENTS

| | | |
|---|---|---|
| 1,750,597 | Hollister | Mar. 11, 1930 |
| 1,884,022 | Lunati | Oct. 25, 1932 |
| 1,928,465 | Schultz | Sept. 26, 1933 |
| 1,958,960 | Warner | May 15, 1934 |
| 2,264,379 | Hubbard | Dec. 2, 1941 |
| 2,821,264 | Ulinski | Jan. 28, 1958 |